June 11, 1929.   C. DOERING ET AL   1,716,488
CHEESE TREATING MACHINE
Filed June 7, 1926   4 Sheets-Sheet 1

June 11, 1929.  C. DOERING ET AL  1,716,488
CHEESE TREATING MACHINE
Filed June 7, 1926  4 Sheets-Sheet 3

Patented June 11, 1929.

1,716,488

UNITED STATES PATENT OFFICE.

CHARLES DOERING AND HENRY H. DOERING, OF CHICAGO, ILLINOIS.

CHEESE-TREATING MACHINE.

Application filed June 7, 1926. Serial No. 114,085.

Our invention relates to a method of pressing and treating cheese so as to completely seal not only the wrapper of the cheese but also the interstices or pores to prevent exudation and loss of the oils or butter fats; the invention also has for its object the provision of a machine whereby cheese, previously cut and wrapped, is subjected to compression and moulded or pressed into proper shape in conjunction with the wrapper, usually of cheesecloth or suitable tin-foil; the cheese while under compression being automatically fed through a treating and heating zone and subjected to a predetermined degree of indirect heat for the purpose of sealing the wrapper or tin-foil while at the same time sealing the pores of the cheese, thus not only preventing the ingress of air but also preventing the loss of the butter-fats or oils.

One object of our invention is to provide an apparatus whereby the operation of compression and the operations of carrying the cheese through the heating zone, and subsequently if desired through a cooling zone, as well as the delivery of the cheese from the compression carriers or molds will all be automatically accomplished.

The objects and advantages of our invention will be readily comprehended from the detailed description of the accompanying drawings, wherein—

In the particular exemplification of our invention as illustrated in the drawings, it consists of a suitable frame or standard composed of the various frame members 20 and the horizontally disposed track members 21, 21 which may be in the nature of angle irons as illustrated and all suitably connected together to provide a suitable supporting structure having intermediate supporting standards as at 22. The horizontally disposed members 21 on their opposing faces are shown provided with small angle irons 23, see Figure 5, in order to provide a track-way for the endless element or chain 24 which is preferably of the swiveled link construction more clearly shown in Figures 2 and 4; it being understood that a pair of endless elements or chains are used to travel in spaced parallel relation from end to end of the machine as will be clearly understood from the apparatus as disclosed in Figure 1.

Figure 12:
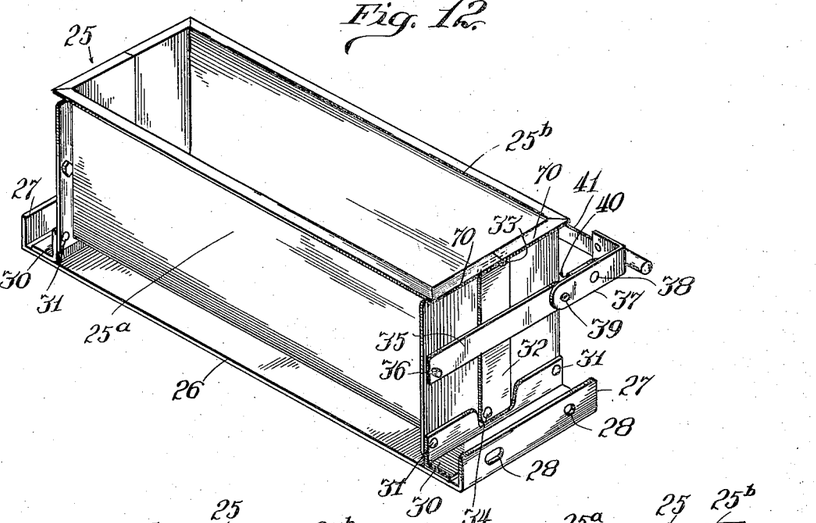
Figure 12 is a perspective view of one of the cheese molds or compression members.

These endless elements or chains are secured to opposite ends of the cheese molds or compression elements 25 one of which is shown in perspective in Figure 12; it being understood that the chains or endless elements are spaced apart a distance commensurate with the length of the molds or compression elements 25.

Figures 1, 2, 3:
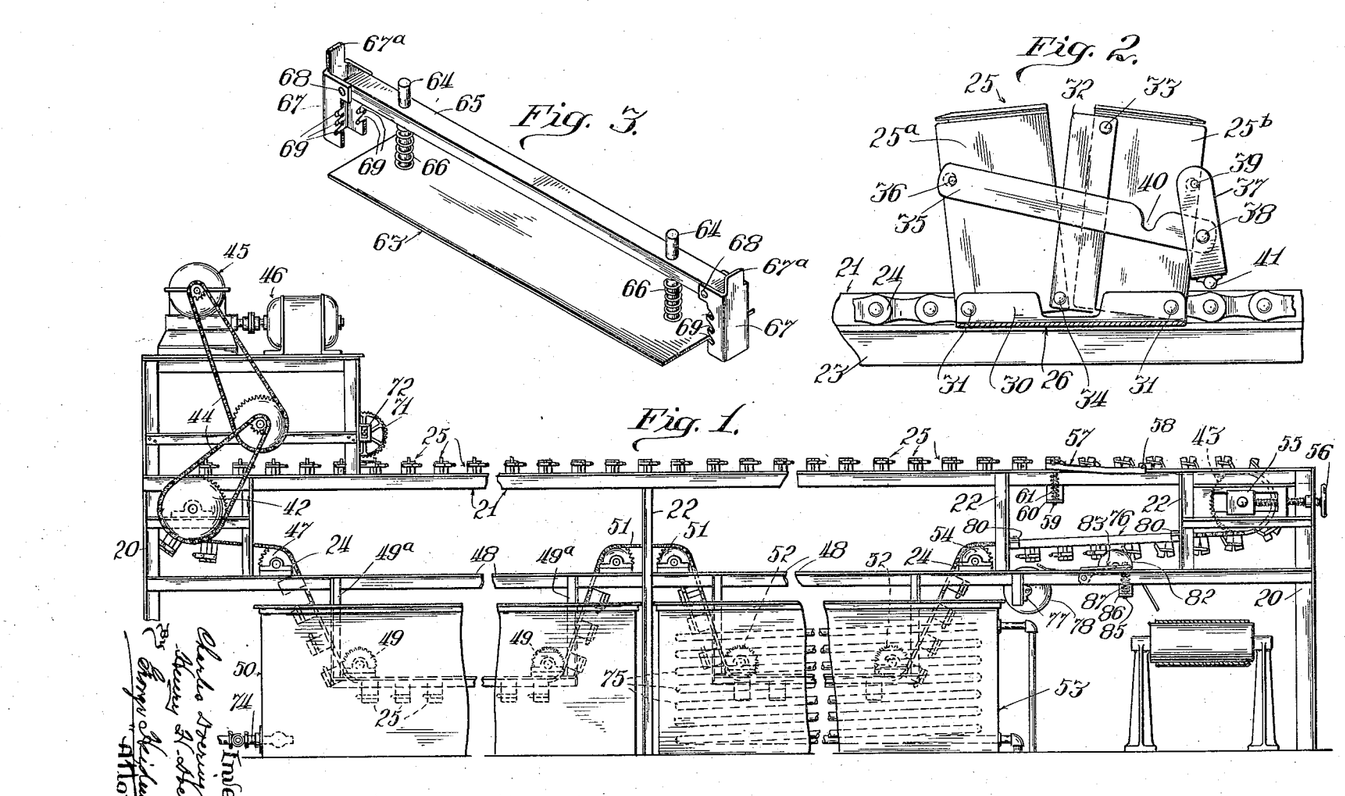
Figure 1 is an elevation of our improved apparatus or machine and a portion of an endless carrier shown in section with intermediate sections broken away.
Figure 2 is a detail view of one of the molds or compression elements shown in open position.
Figure 3 is a detail perspective view of the mold or compression element cover.

The compression elements or cheese molds consist of sectional receptacles each comprising the two halves 25$^a$ and 25$^b$ of dimensions to provide a receptacle of desired length and depth provided with a bottom 26 which is shown preferably of somewhat greater width than the receptacle proper and of greater length. The ends of the bottom portion 26 are bent upwardly to provide the flanges 27, 27 which in turn are apertured as at 28 so as to be pivotally connected at the points 29, see Figure 5, to the endless elements or chains 24. In the specific exemplification of the invention, the sections or halves 25ª and 25ᵇ are shown secured to the bottom 26 by the angle bars 30; the sections being secured to the angle bars at the lower outer corners by means of suitable pivot points as at 31 to permit the sections or halves to swing into the open position shown in Figures 2 and 4. Each end of the molds or receptacles is shown provided with a lapping plate 32 adapted to lap the juncture between the sections; the upper end of the lapping plate being riveted at 33 to the mold section 25ᵇ while the lower opposite corner is pivoted at 34 to the lower part of the mold section 25ª. Secured to each end of the molds or compression receptacles is a link 35, one end whereof is pivoted at 36 to mold section 25ª, while the opposite end has a lever member 37 pivotally secured thereto at 38; the lever 37 being secured at an intermediate point to link 35 see Figure 12. The free end of lever member 37 is provided with a pin 39 adapted to take into the flared slot 40 in link 35 when the lever member 37 has been tilted upwardly into locking position. The lever member 37 (one at each end of the compression receptacle) have their outer ends secured to a connecting bar or rod 41 so that the locking mechanism at both ends of the receptacle may work in unison; and the bar or rod 41 is preferably provided with round ends extending beyond the levers and links as shown in Figure 2.

The endless elements or chains 24 are adapted to rotate about suitable drive members 42, 42 and driven elements 43 shown arranged at opposite ends of the machine; the drive elements 42 being operated by means of belts 44 driven from a suitable reduction gearing generally indicated at 45 operated by means of an electric motor 46 or other suitable source of power. The endless elements or chains 24 are caused to travel about the driving elements 42, thence over wheels 47 located in a lower plane than the driving element 42, namely on the lower frame member 48; the endless elements or chains then continue down beneath suitable wheels 49 shown disposed in a tank or receptacle 50 in the bottom of the machine, from whence the endless elements or chains pass upwardly over wheels 51 and thence downwardly and beneath the wheels or rollers 52 shown disposed within a second tank or receptacle 53, and thence upwardly over a wheel 54 from whence the elements or chains pass about wheels or rollers 43 at the loading end of the machine to traverse the path as originally described. The pulleys or wheels 43 are shown trunnioned in blocks 55 slidably mounted in a suitable framework of the machine and controlled by adjusting screws 56 in order that slack in the endless elements or chains may be taken up.

The cheese sectional molds or compression receptacles 25, when passing over pulleys or wheels 43, at what constitutes the loading end of the machine, are in open position ready to receive the rectangular piece of cheese which is dropped through the open top between the sections 25ª and 25ᵇ after having been previously wrapped in a suitable wrapping, namely in cheese-cloth or in tin-foil. At a suitable point slightly removed from the charging or loading end of the machine the run-way for the endless elements is provided with the upwardly sloping or inclining plates or tracks 57 on each side of the machine. One end of each plate or track 57 is pivotally mounted at the point 58, see Figure 13, while the other or elevated end is yieldingly supported by means of a pin 59 disposed vertically and yieldingly secured to the frame of the machine by means of a suitable bracket 60, see Figures 1 and 14; the pin 59 being yieldingly held in normal raised position by means of a suitable coil spring 61. The elevated ends of the plates or tracks 57 at the inner sides thereof each terminates in a finger or projection 62, see Figures 13 and 14. As will be seen from Figures 1, 13 and 14, the ends of the rods 41 of each mold or compression receptacle will ride on top of the inclined plates or tracks 57, thereby gradually lifting the rod 41 and outer ends of lever members 37 until the pins carried by the free ends of the lever members 37 enter the flared portions of the slots 40 in links 35; the pins 39 being gradually forced downwardly by the continuous upward pressure exerted by the tracks 57 until the fingers or tips 62 finally move the rod 41 into a position where it will be substantially on dead center with the pivot points 38, at which time the pins 39 will have been forced into the lower ends of the slots 40; links 35 and lever members 37 then being substantially on dead center as shown in Figure 12 at which time the sections of the compression receptacle or mold will have been moved into juxtaposition as shown in Figure 12.

After the sections with the cheese therein have been thus closed, namely after the molds or compression receptacles move beyond the ends of the elevated plates or tracks 57, the operator inserts a top or cover member in the upper end of each sectional receptacle. These tops or covers are shown in detail in Figure 3 and consist of the flat plate 63 adapted to fit into the receptacle; the plate 63 being provided with suitable upstanding pins 64, 64 which are disposed through a bar 65 extending lengthwise of the cover; the portion of the pins 64 intermediate of the bar 65 in the plate 63 being provided with compression springs 66.

The ends of the bar 65 are provided with latch members 67, 67 pivotally secured to the bar at 68, these latch members on their sides disposed toward the plate being provided with a plurality of notches as at 69 see Figure 3. The tops of the receptacle sections 25$^a$ and 25$^b$ are shown flanged at 70 which are intended to enter the notches 69; it being noted that the latch members 67 are of a type adapted to straddle the juncture between the mold sections so that the latch members may engage with the flanges of both sections.

Figure 4:
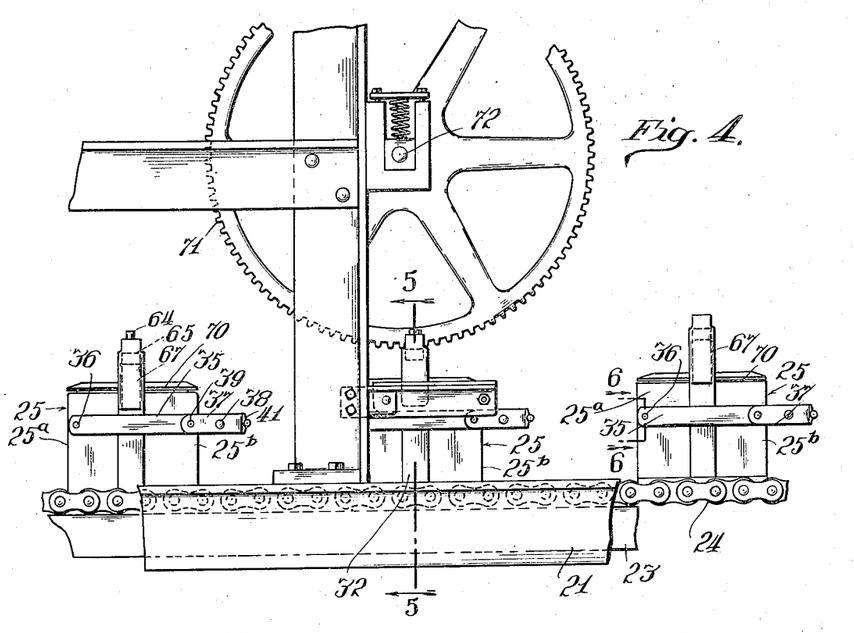
Figure 4 is a detail elevation of the cover pressure applying means and a portion of the traveling molds located at the left hand end of the machine as illustrated in Figure 1.
Figure 5:
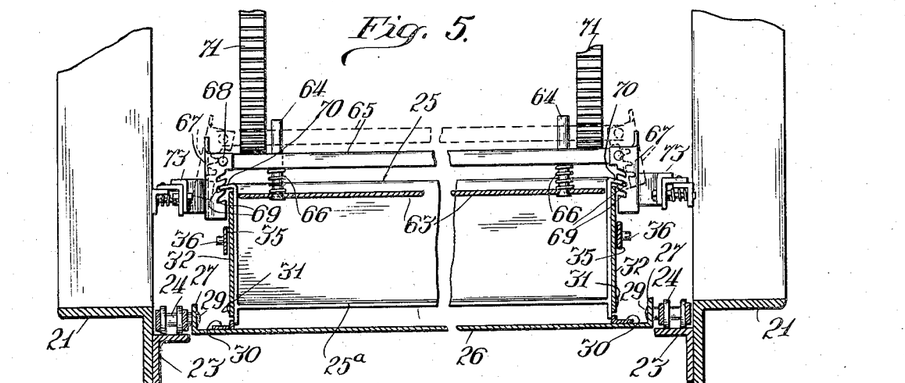
Figure 5 is a detail sectional view taken substantially on the line 5—5 of Figure 4 looking in the direction of the arrows.

The cheese molds or compression receptacles with the tops or cover members inserted above the wrapped cheese, travel lengthwise of the machine toward the left in Figure 1 until the bars 65 of the respective molds are engaged by the toothed wheels 71, 71 see Figures 1, 4 and 5; the wheels 71 being freely mounted to rotate through contact with the traveling receptacles. The wheels 71 are preferably toothed as shown to prevent slipping when they engage with the cover-bars 65. These wheels are yieldingly mounted as shown at 72 in Figure 4 above the traveling elements and force the bars 65 and covers 63 downwardly so as to firmly compress the wrapped cheese within the sectional molds or receptacles. As the latch members 67, 67, through the action of gravity normally depend from the ends of the bar 65, the latch members are in position to be forced toward the flanged ends of the molds by suitable guide means, as at 73, 73 mounted as shown in Figure 5; the guide members 73 causing the latch members 67 to be forced toward the receptacle into locking engagement with the flanges of the mold at the moment of maximum pressure exerted by the wheels 71, 71, thus firmly locking the cover members in the receptacles, with the cover plates 63 in snug relation with the side walls of the receptacle, as shown in Figure 5.

The receptacles with their covers locked in place then continue their travel beyond presser wheels 71, about the drive element 42 and downwardly over pulleys or wheels 47 and downwardly beneath wheels 49 into the tank or receptacle 50; the wheels 49 being supported on a suitable suspending frame 49$^a$. Tank 50 is provided with hot water at a temperature of approximately 160 degrees Fahrenheit or preferably with a brine solution at boiling temperature; the water in the receptacle or tank being maintained at the desired temperature in any suitable manner, as for example by means of steam introduced through a steam pipe 74, see Figure 1; the inner end of the pipe 74 being provided with a suitable nozzle of a type which will induce a circulation of the water and commingling thereof with the steam at the point of introduction, or where brine solution is employed, the solution is maintained at boiling temperature in any suitable manner.

The tank 50 is of a predetermined size and length and the length of travel of the endless elements with the cheese-holding receptacles or molds through the tank as well as the speed of operation are all so correlated that the cheese-holding receptacles or molds are maintained within the hot water for approximately two minutes or in the brine solution for a period preferably not in excess of one minute, or at least for a period of time sufficient to thoroughly heat the molds and cause the tin-foil or cheese-cloth wrapping of the cheese to become sealed at the overlapping ends as well as to sufficiently heat the outer surface of the cheese and thereby seal the pores of the cheese on the outer surface. It will be understood that the receptacles with the cheese are kept within the heating medium in tank 50 a length of time merely sufficient to heat the metal walls of the receptacles or sectional molds to a degree sufficient to produce the result desired without subjecting the entire mass of cheese to an undesirable temperature. With the folded overlapping ends of the tin-foil or cheese cloth thus sealed, as well as the pores of the cheese on the outer surface, also sealed through the action of the heat and by the coating of the brine, it is apparent that the product delivered from the machine will be sealed against ingress of air while the oils or fat globules will be retained in the cheese and as a result the cheese is in condition to be kept for an almost indefinite period without deterioration.

After the sectional molds or compression receptacles with the cheese leave the heating tank 50, they travel over the wheels or rollers 51 and are then made to pass down into the receptacle or tank 53 about the wheels or rollers 52. Tank 53 constitutes a cooling receptacle which is provided with a cooling solution or water kept at a sufficiently low cooling temperature by means of the cooling coils 75. The size of tank 53 and length of travel of the molds with the cheese therethrough are such that the receptacles as well as the wrapped cheese will be completely chilled before delivery of the cheese from the apparatus is made.

It will be understood that the relation between the covers 63 and the sectional molds or compression receptacles is such that ingress of moisture is prevented.

The cooled receptacles then travel upwardly from tank 53 over wheels or rollers 54 toward the cheese delivering end of the machine, which also constitutes the loading end of the machine, as disclosed in Figure 1. It is, of course, understood that when the receptacles pass downwardly about the driving element 42 and during their travel through tanks 50 and 53 and upwardly over wheels 54 the receptacles are in inverted position with the covers disposed downwardly.

Figure 8:
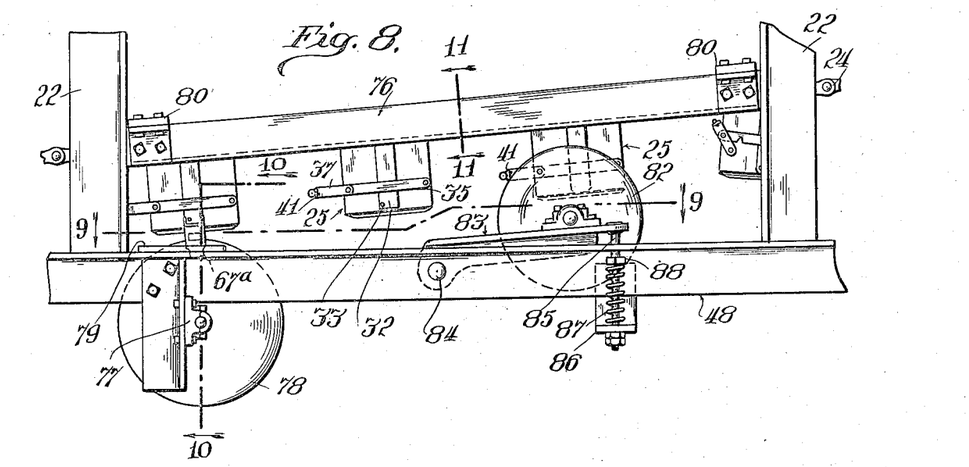
Figure 8 is an enlarged sectional elevation taken at the delivery end of the machine, namely at the right hand end of Figure 1.
Figure 9:
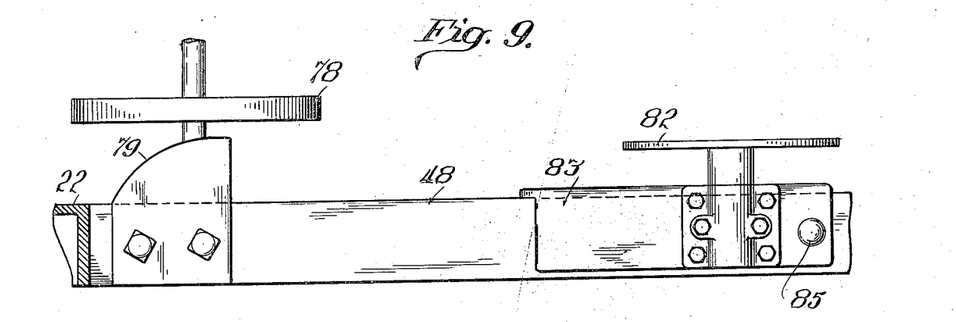
Figure 9 is a detail sectional view taken substantially on the line 9—9 of Figure 8 looking in the direction of the arrows.
Figure 10:
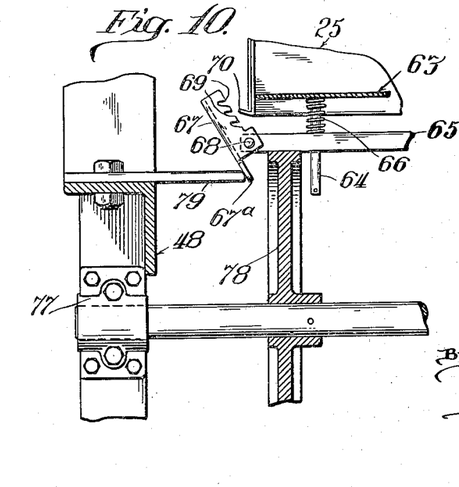
Figure 10 is a detail sectional view taken substantially on the line 10—10 of Figure 8 looking in the direction of the arrows.
Figure 11:
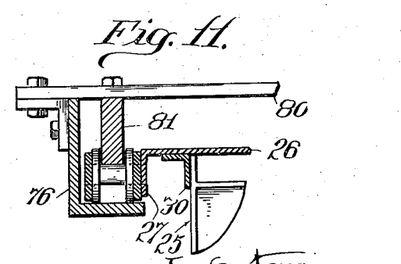
Figure 11 is a detail sectional view taken on the line 11—11 of Figure 8 looking in the direction of the arrows.

The delivery end of the machine, namely the portion intermediate of wheels 54 and pulleys or wheels 43 and beneath the upper longitudinal frame 21, is provided with a chain track-way 76, which may be in the nature of angle bars as shown in Figure 11 arranged to suitably support the endless elements or chains while the receptacles 25 depend between the correlated track-ways disposed at opposite ends of the receptacles, see Figures 8 and 11. The track-ways 76 are arranged at an upward inclination from pulleys 54 at a point intermediate of the longitudinal upper frame members 21 and the lower frame members 48, see Figure 1. Mounted in suitable bearings 77 depending from frame members 48 are suitable wheels 78 (one adjacent to each end of the receptacle) which are adapted to engage and press the bars 65 as the receptacles travel toward the delivery end of the machine. Mounted on the frame members 48, at a point coincident with the wheels 78 (namely on opposite sides of the machine) are arcuate tripper plates 79, the arcuate faces whereof are adapted to engage with the short ends or lips 67ª of the latch members 67, see Figure 10. The arcuate face of the tripper plates 79 are so formed that the notched ends of the latch members 67 will be forced out of engagement with the flanges 70 of the receptacles when the cover bars 65 reach the point of maximum upward pressure induced by the wheels 78.

In order that the endless elements or chains 24 during such upward pressure of the wheels cannot move or flex upwardly, we provide a back stop shown in Figure 11 consisting of the cross-bar 80 extending transversely of the machine and suitably mounted to the frame thereof; the cross-bar 80, at points immediately above the endless elements or chains 24 at opposite sides of the machine being provided with the depending blocks or elements 81 disposed across the top of the chains as shown in Figure 11, thus preventing upward movement thereof.

After the receptacles pass over the wheels 78, the covers are unlatched and are free to drop away from the receptacles as soon as the latter have been moved into delivering position, namely into the open position shown in Figure 2. This operation is produced by the wheels 82 suitably mounted on yielding frame members 83 which are pivoted at 84 to the main frame members 48 (see Figures 1 and 8); the free ends of the frame members 83 being held in raised position through the action of the plunger rods or pins 85 disposed through suitable holes in the main frame members 48 and the lower end or flange of bracket 86 which provides a stop for compression spring 87 disposed about the plunger rods; the springs exerting upward pressure on the rods through the medium of the collars 88. As the receptacles approach wheels 82, the extended ends of rod 41 engage the periphery of the wheels and are caused to ride upwardly thereon thus moving the pins 39 at the inner ends of lever members 37 out of the slots 40 in links 35.

With our improved method of treating cheese, namely by passing the pressed and wrapped cheese through a heating medium so that the cheese or the compressing receptacles are not subjected to direct heat, exudation and loss of the oils or butter-fats is prevented.

Where the cheese-holding receptacles are to pass through a tank or receptacle containing hot water, it has been found in practice, in order to obtain the desired results, that the water should approximate 160 degrees Fahrenheit and the length or time of travel therethrough should approximate that heretofore stated.

We have discovered that superior results may be obtained by passing the compressing receptacles with the cheese through a brine solution at boiling temperature for a period of about one minute. The hot brine will not only seal the wrapper but will fill any large openings and pores in the cheese and form a coating which prevents loss of the oils or butter-fats and prevents ingress of air. This coating, which may be readily removed when the cheese is to be used, tends to preserve the quality of cheese and therefore lengthens the period of usefulness. Where it is desired to treat or seal the cheese through the use of a suitable brine solution, it is preferable to have the moulds or receptacles and the covers perforated so that the brine solution may get into direct contact with the wrapper and the cheese, so that it may form a coating on the cheese which completely seals all pores therein and prevents the oils or butter-fat escaping from the cheese.

Figure 13:
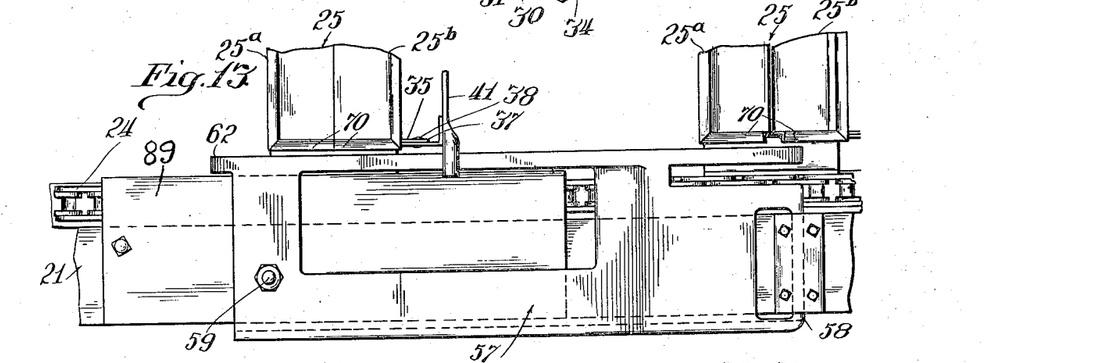
Figure 13 is a plan view of a portion of the machine at the loading end, portions being broken away, showing the receptacle latch controlling means.
Figure 14:
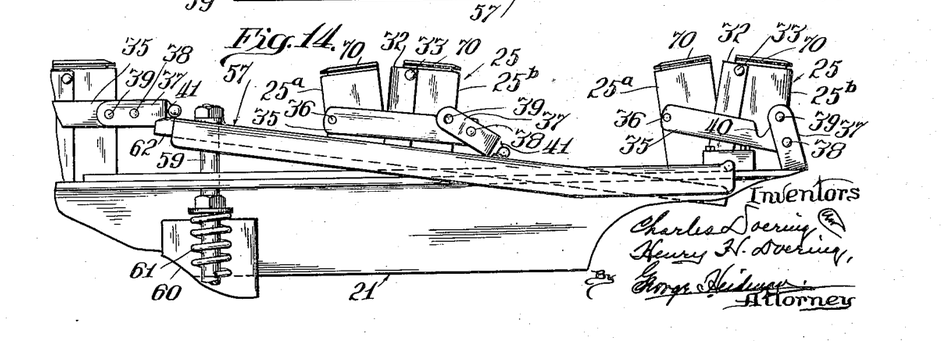
Figure 14 is a detail view in elevation at the initial or charging end of the machine shown in Figure 13 and illustrating the automatic means for closing the cheese molds or compression elements.

The construction of the means for closing the receptacle sections, namely for moving the receptacle locking means into locking position is more clearly disclosed in Figures 13 and 14, where the elevated plate 57 is shown pivoted at 58 while the free end is yieldingly forced upward by the coil spring 61 so as to exert a constant upward pressure on the ends of rod 41. As the receptacles are connected to the chains 24, we provide a plate 89 secured to the main frame 21 above the chains 24 so as to prevent upward movement of the chains and the receptacles while members 57 are pressing upwardly on the ends of rods 41.

Figure 6:
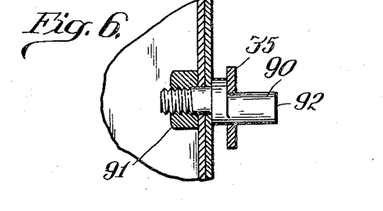
Figure 6 is a detail sectional view taken substantially on the line 6—6 of Figure 4.
Figure 7:
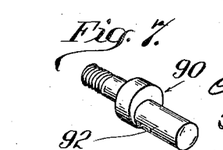
Figure 7 is a detail perspective view of a play or take-up element employed on the sectional mold or compression carrier.

In Figures 6 and 7 we show means for adjusting the links 35 and to take up any play in order to ensure proper closing of the receptacles and pressure on the cheese. This means is specifically shown in the form of a pin 90, one end whereof is threaded and passes through a hole in the wall of the receptacle section as shown in Figure 6, with the inner end provided with a suitable nut as at 91; while the head portion is provided with an eccentrically arranged lug or pin 92, which receives the end of link 35. It is apparent that by proper rotation of pin 90, the eccentric portion 92 may be moved toward or away from the opposite side of the receptacle and any play between the receptacles and the locking means taken care of.

We have shown what is believed to be a preferred embodiment of the invention and have described the same in terms employed merely as terms of description and not as terms of limitation, as structural modifications are possible and may be made without, however, departing from the spirit of our invention.

What we claim is:

1. A machine of the character described comprising endless traveling means, normally open sectional cheese-holding receptacles secured to said means, means disposed along the path of the endless traveling means for automatically forcing the sections of the receptacles into closed position, a heating zone and a cooling zone through which the receptacles are made to travel, and means whereby the receptacles are automatically opened at a predetermined moment and the cheese delivered therefrom.

2. A machine of the character described comprising a plurality of sectional cheese-holding receptacles arranged in line with each other, the sections being pivotally secured together so as to swing into open position, means whereby the receptacles are made to continuously travel through the machine, means disposed along the path of travel whereby the receptacle-sections are swung about their pivotal points into closed position and automatically locked in closed position, and means whereby the receptacle-sections are unlatched from each other and the cheese automatically released from the receptacles.

3. A machine of the character described comprising a heating zone and a cooling zone, a plurality of normally open cheese-holding receptacles arranged in line with each other and adapted to travel successively through the machine, means arranged along the path of travel whereby the receptacles are closed and the cheese placed under compression, means whereby the receptacles are made to continuously travel through the machine successively through said zones, and means adjacent to the delivery end of the path of travel through the machine whereby the receptacles are opened and the cheese released therefrom.

4. A machine of the character described comprising sectional receptacles provided with locking means arranged at opposite ends, the sections of each receptacle being pivotally secured together at opposite ends, means whereby said locking means are moved to locking position, covers for the receptacles, locking means for said covers, means for pressing the covers and for moving said locking means into cover-locking position, and means for releasing the cover locking means and said receptacle locking means.

5. A machine of the character described, comprising a plurality of sectional receptacles provided with locking means arranged at opposite ends of the sections, the sections of each receptacle being pivotally secured together at opposite ends, endless means for conveying the receptacles continuously through the machine, means disposed along the path of travel for moving the sections together and forcing the locking means into receptacle closing position, cover members for each receptacle adapted to move downwardly into the receptacles, locking means for said cover members, means whereby said last locking means are forced into cover locking position, and cover releasing means arranged at a predetermined point in the travel of the receptacles.

6. A machine of the character described, comprising sectional receptacles pivotally secured together, means for moving and locking the non-pivoted ends of the sections in closed position, means whereby the receptacles are made to travel from end to end of the machine, means along the path of travel for moving said locking means into locking position, covers adapted to fit into the receptacles, means for locking the covers in place, means whereby said cover locking means is moved into locking position as the receptacles travel through the machine, and means in advance of the delivery end of the travel whereby the covers and the receptacle section locking means are moved out of locking position.

7. In a machine of the character described, cheese holding receptacles adapted to travel through the machine and composed of sections pivotally secured together to swing apart at top, a pair of links on each end of the sections, pivotally secured together intermediate of their ends and to the sections, one link of each pair being provided with a slot while the other link of each pair has a pin adapted to enter into said slot, a connecting bar between the links provided with the pins, and means disposed in the path of said connecting bar whereby the latter and the pin carrying links are moved upwardly and the pins forced downwardly into said slots.

8. In a machine of the character described, cheese holding receptacles adapted to continuously travel through the machine, said receptacles being each composed of two sections pivotally secured together at opposite ends, interengaging links pivotally secured together to the sections, a member secured to one of the links and disposed beyond the plane of the end of the receptacle, and striking means disposed along the path of the receptacles, adapted to engage said member and thereby force the links into interengaged position while causing the sections to move into closed position.

9. In a machine of the character described provided with a race-way, sectional cheese-holding receptacles adapted to travel along said race-way, independent cover members for the receptacles and each provided with a latch means carrying bar having spring pressure relation with the cover proper, and means disposed along the race-way whereby said bars are depressed, the cover proper placed under pressure and the latch means moved into latching engagement with the receptacles.

10. In a machine of the character described, cheese-holding receptacles, cover members for the receptacles each comprising a cover plate adapted to fit into the receptacle, a bar disposed across the plate and having spring pressure connection with said plate, latch elements secured to opposite ends of the bar and adapted to engage with the walls of the receptacle when moved into locking position, means adapted to engage said bar to depress the same and thereby place the plate under pressure, and means whereby the latch elements are forced into locking relation with the receptacle.

11. In a machine of the character described, provided with a race-way, sectional receptacles arranged to travel along said race-way, means whereby the receptacle sections are forced together into closed position, means disposed along the race-way for actuating said last mentioned means, cover members for the receptacles, each comprising a cover plate adapted to fit into the receptacle, a bar disposed lengthwise of the cover plate and yieldingly connected thereto, latch members pendently secured to the ends of the bar and adapted to form latching engagement with the walls of the receptacle, means disposed above the race-way for engaging said bar thereby placing the cover plate under pressure, and means disposed along opposite sides of the race-way for moving said latch elements into locking engagement with the walls of the receptacle.

12. In a machine of the character described provided with a continuous race-way, sectional receptacles adapted to travel along said race-way first in upright position and then in inverted position toward the delivery end, means whereby the sections are locked together in closed position, means disposed along the race-way whereby said last mentioned means is moved into receptacle section closing position, cover members for each of the receptacles, latch members pivotally secured to the cover members adapted to have locking engagement with the opposite ends of the receptacles, means disposed above the race-way for yieldingly pressing the cover members into the receptacles, means disposed on opposite sides of the race-way for moving the latch members into locking engagement, means in advance of the delivery end of the race-way for releasing the cover members and moving the latch members out of locking engagement, and means whereby the receptacle sections are unlocked and said sections moved into open position.

13. A machine of the character described, comprising a continuous race-way, the upper part of the race-way constituting a loading portion while the lower part constitutes a delivering portion, a heating zone and cooling zone arranged beneath the race-way, sectional receptacles arranged to travel along the race-way and through said zones, means whereby the receptacles are forced together and locked in closed position, cover members for each of the receptacles consisting of a cover plate adapted to fit into the receptacle, a bar disposed lengthwise of the plate and having pressure-applying relation therewith, latch members secured to the ends of the bar and adapted to have locking engagement with the walls of the receptacle, means disposed above the race-way for engaging said bars and placing the cover plates under pressure, means whereby the latch members are forced into locking engagement, means disposed beneath the race-way at the delivery end thereof for upwardly pressing the bars and to move the latch members out of locking engagement with the walls of the receptacle, and means whereby said first means are actuated and the receptacle sections forced into open position.

14. A machine of the character described, provided with an endless traveling element, sectional cheese holding receptacles secured to said element, the sections of each receptacle being pivotally secured together at the ends, cover members adapted to fit into the receptacles, means whereby the cover members are forced into the receptacles and placed under pressure, means whereby the cover members are locked to the receptacles and means disposed along the path of the receptacles whereby the cover member locking means are released.

15. A machine of the character described comprising a race-way, cheese holding receptacles adapted to travel along said race-way and each composed of sections pivotally connected together at one of the ends so as to permit the free ends of the sections to swing apart, said receptacles being adapted to place the cheese under pressure, means for forcing the respective sections together and for locking the same in place, and means whereby said last mentioned means are released and the respective sections caused to swing into open position where the receptacles reach a predetermined point in said race-way.

16. A machine of the character described comprising sectional cheese-holding receptacles adapted to continuously move through said machine, the sections of the respective receptacles being pivotally connected together to permit the sections to swing apart into open position, means cooperating with the sections of said receptacles whereby the sections are forced together and the cheese is placed under pressure, means whereby the receptacles are subjected to indirect heat while moving through the machine, and means whereby the receptacle sections are placed in cheese releasing condition when said receptacles reach a predetermined point in their movement through the machine.

CHARLES DOERING.
HENRY H. DOERING.